Figure 1:
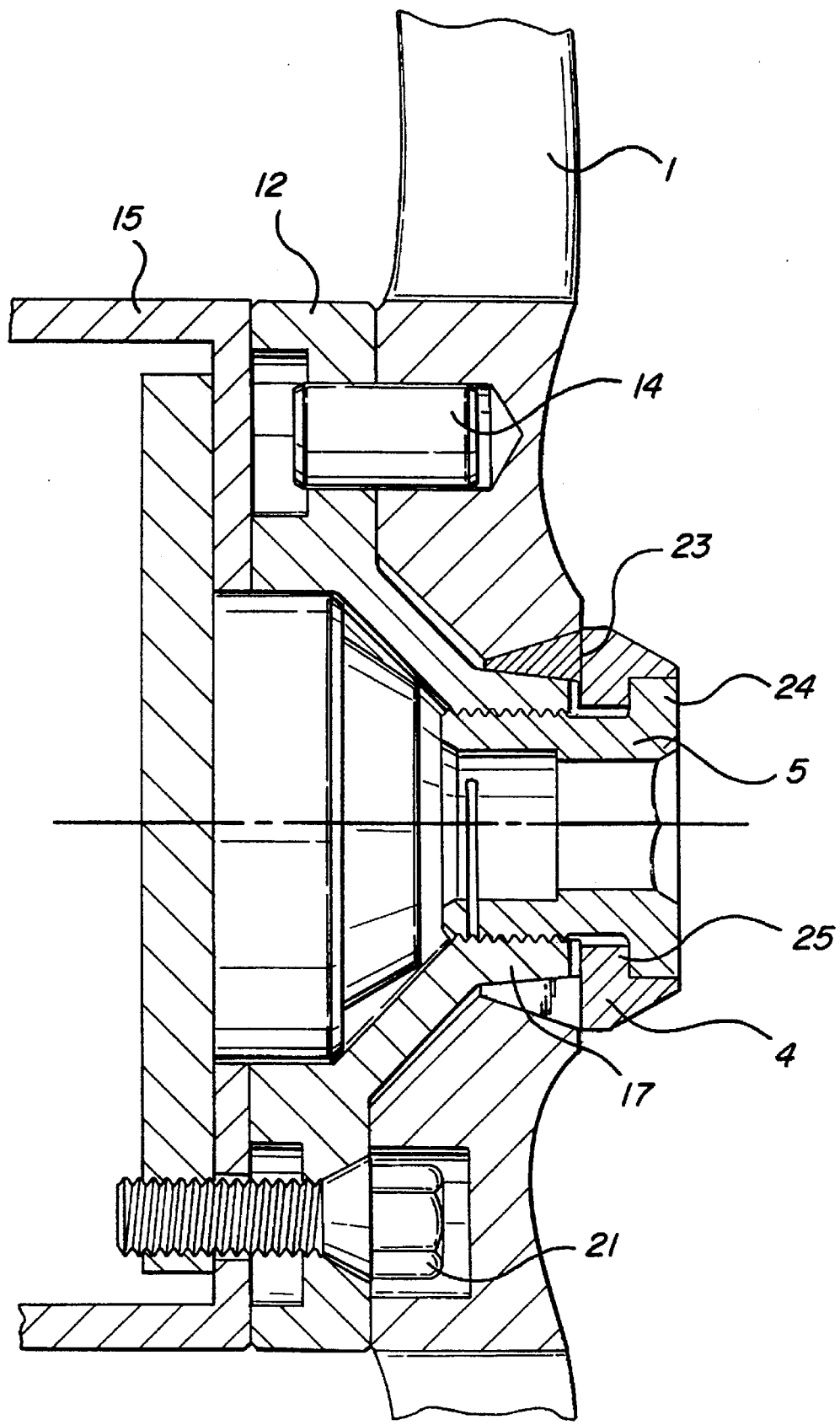

United States Patent [19]
Pagacz

[11] Patent Number: 5,636,905
[45] Date of Patent: Jun. 10, 1997

[54] SYSTEM FOR CENTRAL FASTENING A WHEEL TO A VEHICLE

[76] Inventor: Zbigniew L. Pagacz, Schäferkamp 1, 27419 Sittensen, Germany

[21] Appl. No.: 373,234

[22] PCT Filed: May 6, 1994

[86] PCT No.: PCT/DE94/00535

§ 371 Date: Jan. 6, 1995

§ 102(e) Date: Jan. 6, 1995

[87] PCT Pub. No.: WO94/26539

PCT Pub. Date: Nov. 24, 1994

[30] Foreign Application Priority Data

May 7, 1993 [DE] Germany .................. 43 15 765.3

[51] Int. Cl.$^6$ ............................................. B60B 3/14
[52] U.S. Cl. ........................... 301/35.63; 301/35.58
[58] Field of Search ..................... 301/35.55, 35.58, 301/35.63, 111, 114

[56] References Cited

U.S. PATENT DOCUMENTS

| | | | |
|---|---|---|---|
| 1,465,958 | 8/1923 | Wheeler | 301/35.58 |
| 1,646,866 | 10/1927 | Ludwick | 301/35.63 |
| 2,257,237 | 9/1941 | Hecht | 301/35.63 |

FOREIGN PATENT DOCUMENTS

| | | | |
|---|---|---|---|
| 543521 | 9/1922 | France | 301/35.58 |
| 1504385 | 12/1967 | France | 301/35.63 |
| 4023912 | 1/1992 | Germany . | |

*Primary Examiner*—Russell D. Stormer
*Attorney, Agent, or Firm*—Fildes & Outland, P.C.

[57] ABSTRACT

A system is given for central fastening a wheel (1) having a central bore (2) to an adapter flange (12) of an axle of a vehicle, wherein according to the invention a double taper ring (23) is adapted to be clamped between said wheel (1) and a central flange portion (17) of said adapter flange (12) by means of a central safety bolt (5) or safety nut (26) in order to obtain a frictional engaged fastening of said wheel (1) to said flange (12).

8 Claims, 4 Drawing Sheets

SYSTEM FOR CENTRAL FASTENING A WHEEL TO A VEHICLE

The invention relates to a system for central fastening a wheel to a vehicle and more particularly to a system for central fastening a wheel having a central bore to an axle of a vehicle.

There is a common knowledge to fasten wheels to the axle of a vehicle by means of a central fastening. Such kind of lock for a fastening is mainly used in motor sport. Central fastenings and fastenings of spoke wheels which have been known previously have several disadvantages as far as security is concerned. Accordingly, they are rarely used in public traffic.

A system for central fastening a wheel to an adapter flange which is attached to the brake drum or the brake disc of a vehicle via bolts is kown from DE 40 23 912A1. Such known wheel is mounted in that an inner cylindrical hole is set on a flange portion which is also cylindrical and which has a corresponding diameter and is fixed via a thread union. Such thread union comprises an external tapered surface which abuts against an inner bore of the wheel which has a correspondingly tapered form.

It has turned out that such kind of thread union is not sufficiently stable in view of the high dynamic load of the wheel.

It is known from U.S. Pat. No. 1,465,958 to clamp a taper ring between wheel and hub by means of a central safety nut to obtain a frictionally engaged fastening of a wheel to the hub. The inner portion of such known taper ring is formed into a cylindrical shape. This makes the dismounting of the taper rings more difficult, especially in such cases where the taper angle of the external tapered section of the taper ring is small.

It is the object of the invention to provide a system for central fastening a wheel to the axle of a vehicle which can be mounted easily and which provides superior safety as far as loosening of the fastening linkage is concerned.

This object is solved by a system for central fastening a wheel having a central bore to an axle of a vehicle, characterized in that a taper ring is adapted to be clamped between the wheel and a central flange portion of the axle by a central safety bolt or safety nut in order to achieve a frictional engaged fastening of the wheel to the axle. The taper ring is formed as a double taper ring, wherein the inner bore of the wheel and the outer shape of the central flange portion comprise a tapered section corresponding to the double taper ring. According to the present invention, a taper ring is adapted to be clamped between a wheel and a central flange portion of the axle by means of a central safety bolt or safety nut in order to obtain a frictionally engaged fastening of the wheel to the flange. The thread union for fastening the wheel exclusively serves to produce the axial thrust load acting on the taper ring, while the clamping of the wheel against the central flange portion is effected independently via said taper ring, so that loads acting on the taper ring cannot have any direct effect on the thread union.

Between the axle and the wheel there can be provided an adapter flange.

Preferably, the safety bolt comprises an external neck upon which either the clamping of the taper ring is effected directly or, in an alternative embodiment, a thrust plate can be pressed against the taper ring. The thrust plate has the advantage that the neck of the safety bolt can be shaped such that it has a smaller diameter. Moreover, the thrust plate can comprise a recess so that the neck of the safety bolt rests on a step portion of said thrust plate, whereby it is possible to achieve an arrangement wherein the safety bolt is countersinked in the thrust plate.

Preferably, the taper ring comprises a radial slit in order to enable easy clamping of the taper ring between the wheel and the central flange portion.

The adapter flange preferably comprises a central bore having a thread for screwing in the safety bolt, wherein the adapter flange can be screwed together with the brake disc or the brake drum.

Particularly, there can be made provision that the safety bolt comprises a recess distant from the bolt head which has a radial gap extending over a certain portion of the circumference so that by mechanically compressing said gap there is achieved a discontinuity of the pitch. During screwing in of the safety bolt in the central thread of the adapter flange said thread is again deformed elastically into its previous shape, whereby self-hemming of the bolt is obtained.

The use of the adapter flange has the advantage that a single embodiment of a wheel can be used for different vehicles in case an accordingly adapted flange is used, the connecting portions of which regarding the vehicle are adapted to such vehicle.

Figure 2:
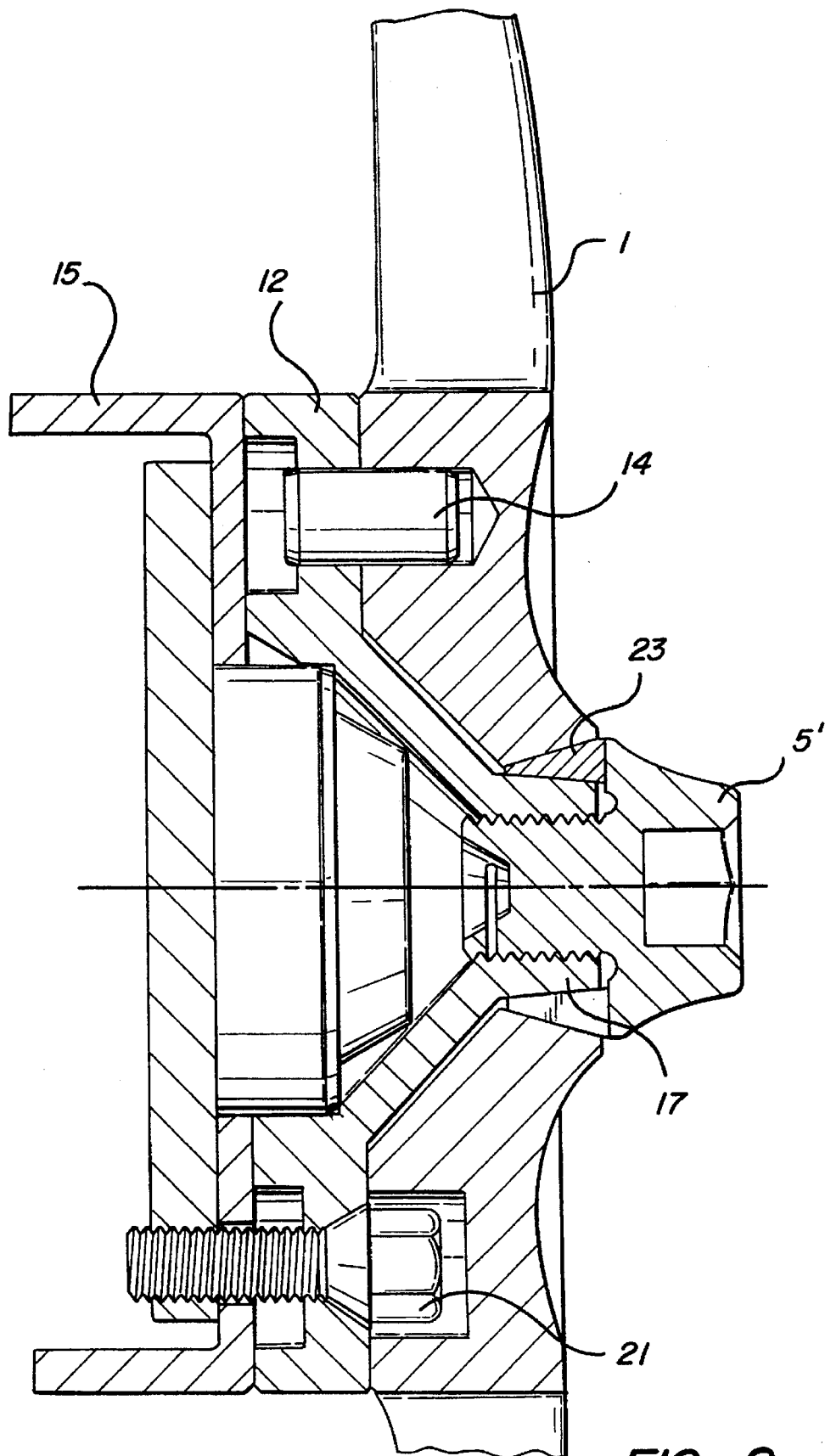
Figure 3:
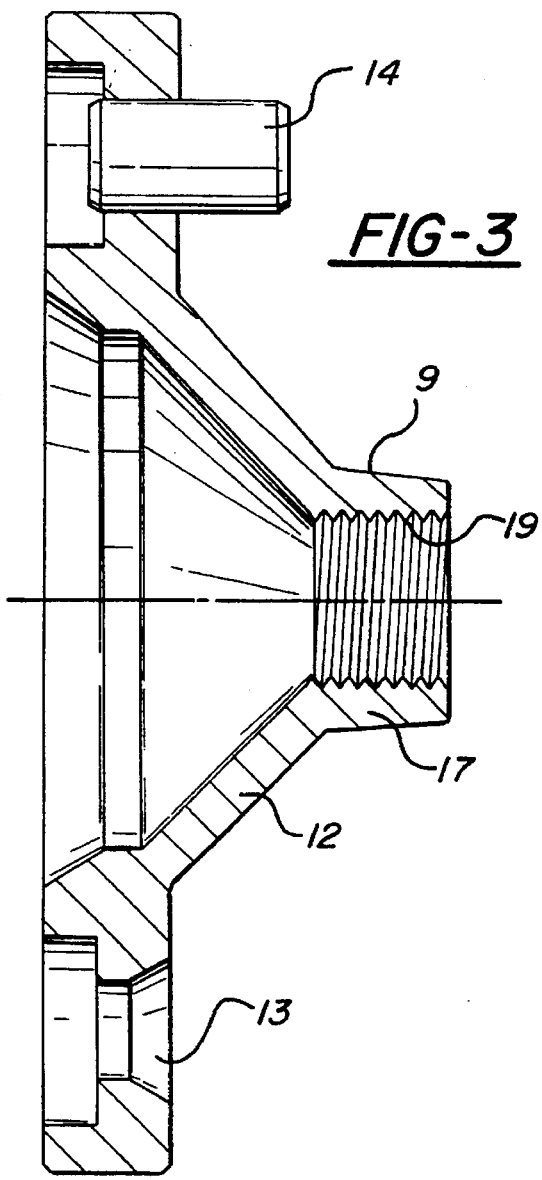
Figure 4:
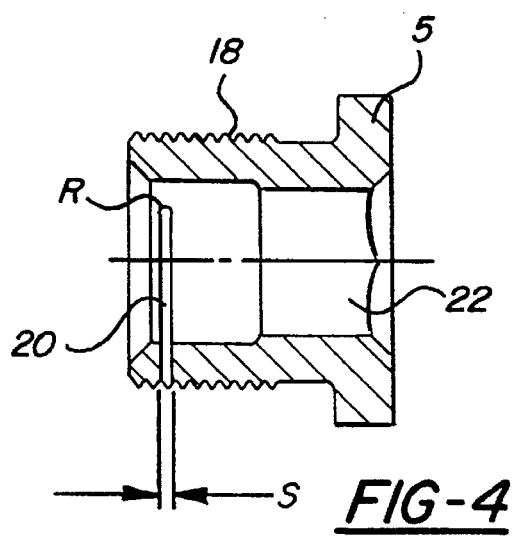
Figure 5:
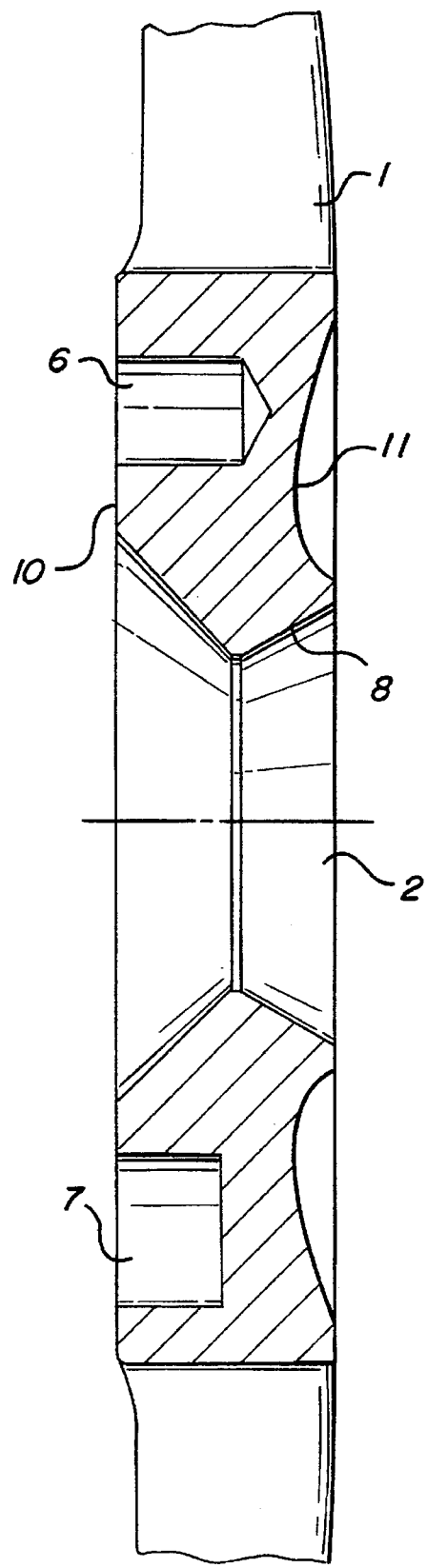
Figure 6:
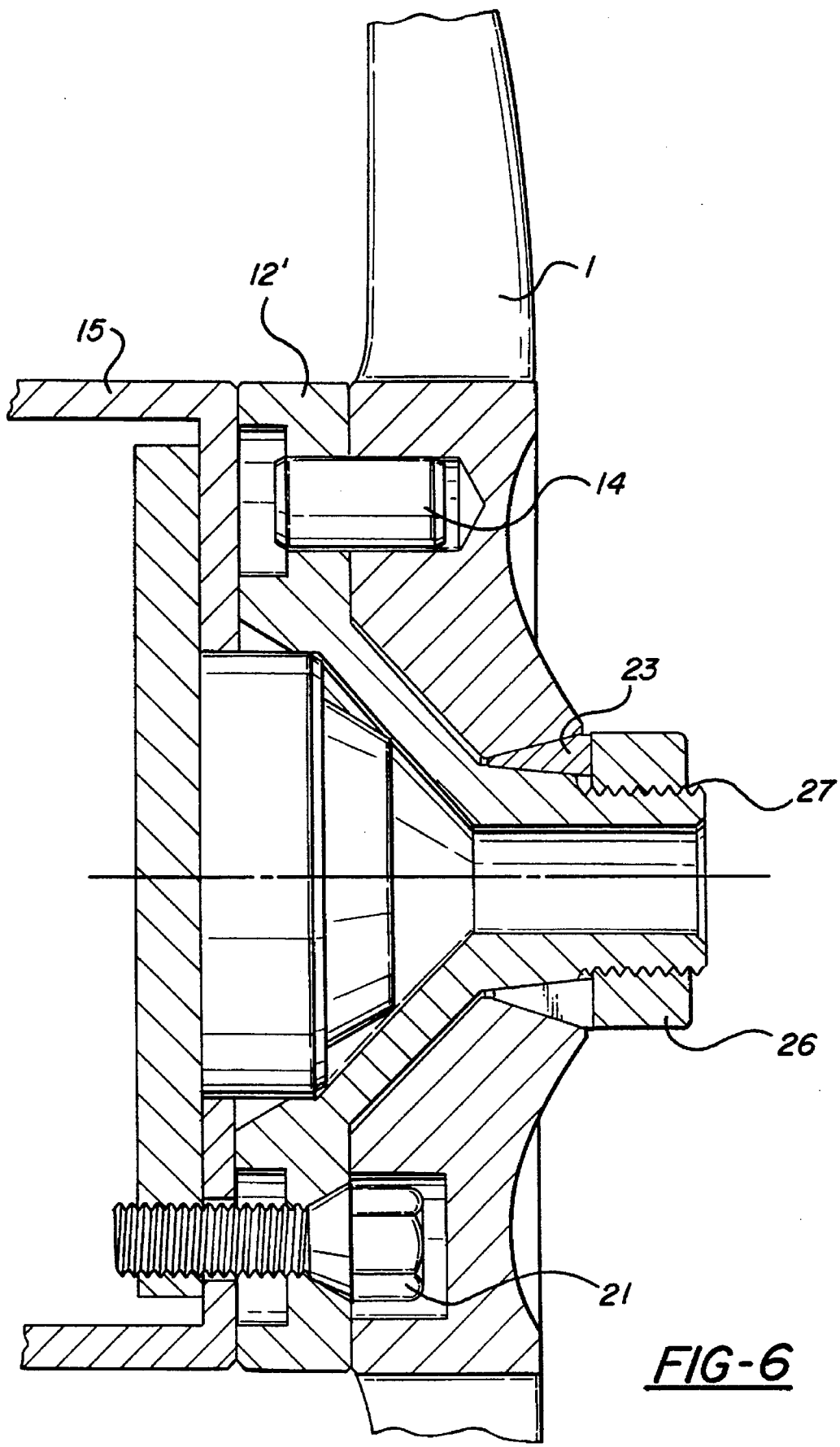

The invention shall be further explained in connection with preferred embodiments. In the drawings shows:

FIG. 1 a sectional view of a fastening system of a wheel,

FIG. 2 a sectional view of an alternative embodiment of the safety bolt,

FIG. 3 a sectional view of an adapter flange for a fastening system according to FIG. 1, FIG. 4 a sectional view of a safety bolt, FIG. 5 a sectional view of a wheel (wheel body), FIG. 6 a fastening system having a safety nut.

FIG. 1 shows an embodiment of a system for central fastening a wheel. An adapter flange 12 is axially fixed on a brake drum 15 by bolts 21. The wheel 1 is set on the central flange portion 17. The wheel 1 is rotatable with respect to the flange 12, wherein the fastening by the central fastening alone would be sufficient to provide a fastening which does not allow rotation. To be on the safe side, an additional pin 14 is provided to achieve a fastening which prevents rotation.

After the wheel 1 is set on the central flange portion 17, a double taper ring 23 is inserted into the gap between the wheel 1 and the central flange portion 17. The taper ring can be pre-mounted in a movable manner in a recess of the wheel. The wheel 1 does not have a stop with respect to the flange 12 in the radial direction. However, it can be centered with respect to the flange. The clamping of the wheel 1 against the flange portion 17 is exclusively effected by pressing in the double taper ring 23 by a safety bolt 5 via a thrust plate 4. Therefore, provision is made that the central flange portion 17 comprises an internal thread in which the safety bolt 5 having an external thread is screwed. A neck 24 of the safety bolt 5 acts on the thrust plate 4 and, therefore, indirectly on the double taper ring 23. It is depicted that the neck 24 of the safety bolt 5 is located in a recess of the thrust plate 4 so that the thrust of the neck 24 of the safety bolt 5 firstly acts on the projection 25 of the thrust plate 4 and then on the double taper ring 23. Hence, it can be achieved that the safety bolt 5 is flush-mounted in the thrust plate 4. When the thrust plate is shaped appropriately, it can be achieved that the outer shape of the central portion of the fastening of the wheel has no edges.

The double taper ring 23 preferably comprises a radial slit, whereby an easy distortion between wheel 1 and central flange portion 17 can be effected.

Due to the tapered shape of the central flange portion 17 an easy dismounting of the wheel from the adapter flange 12 can be achieved even if the taper angles of the tapered section 8 is small.

As shown in FIG. 2, the safety bolt 5' can directly abut with its projection against the double taper ring 23 without using a thrust plate.

A radial force acts on the tapered central portion 17 of the adapter flange 12 by the bias force of the safety bolt 5' via the double taper ring 23, so that in the circumferencial direction between the double taper ring and the central flange portion 17 on the one hand and between the double taper ring and the wheel 1 on the other hand a frictional engaged connection is provided. Such frictional force is substantially higher than the prevailing dynamic operational forces at the wheel. Therefore, the thread union of the safety bolt is not strained by the dynamic operational forces and serves exclusively as torque converter for producing frictional fastening forces.

FIG. 3 shows a sectional view of a flange for fastening the wheel having a tapered central flange portion 17. The flange is set on the brake disc or the brake drum 15 of a vehicle via a plurality of countersunk bores 13 and is screwed tight by means of bolts 21 or nuts. Further, a driving pin 14 is depicted which can engage with a corresponding bore 6 of the wheel in order to completely prevent the possibility of rotation caused by the central fastening.

FIG. 4 shows a sectional view of an embodiment of a safety bolt. The safety bolt 5 is formed as a hollow bolt having an external thread 18 which can be screwed into the flange thread 19. The bolt 5 has a gap 20 which extends radially over a portion of the circumference of the defining a recess bolt. This gap is mechanically compressed before the safety bolt 5 is used so that a discontinuity of the pitch of the thread 18 is obtained in the region of said gap 20. Preferably, this gap is produced in that the bolt 5 is sawed to a predetermined depth at an initial portion of the thread distant from the bolt head. Subsequently, the sawed portion is deformed by a hammer blow. When the safety bolt 5 is screwed into the flange 12, the thread is elastically re-deformed. Accordingly, the thread comprises a self-locking mechanism which provides that the safety bolt cannot become loose unintendently.

At its distal portion the safety bolt has an inner hexagon recess 22 which in combination with an appropriate spanner enables fastening or loosening of the bolt. By respective shaping of the inner hexagon recess it can be achieved that common standard spanners cannot be used for loosening the bolts so that a certain safety against theft is obtained.

FIG. 5 shows a sectional view of a wheel (wheel body). In the central bore 2 only the tapered section 8 serves for fastening to the adapter flange by means of the taper ring. The axial position of the wheel is given by the stop surface 10 which faces the flange 12. The bore 6 serves to receive a driving pin 14 while the bore 7 serves to receive the bolt nuts for fastening the flange to a brake disc or a brake drum.

FIG. 6 shows an alternative embodiment of the present invention. Instead of a safety bolt a safety nut 26 is used which is screwed on a central external thread 27 of the adapter flange 12. The safety nut is preferably self-locking.

The present invention provides a simple and easy central fastening of a wheel (wheel body) to the axle of a vehicle.

List of Reference Signs 1 wheel
2 hole
4 thrust plate
5 safety bolt
6 bore
7 bore
8 tapered section
9 tapered section
10 stop surface
11 cavity
12 adapter flange
13 countersinking
14 pin
15 brake drum
17 central flange portion
18 thread
19 thread
20 gap
21 screw
22 inner hexagon recess
23 double taper ring
24 neck
25 projection
26 safety nut
27 external thread

I claim:

1. A system for central fastening a wheel (1) having a central bore (2) to an axle of a vehicle, characterized in that said axle includes a central flange portion having an outer shape, and a taper ring (23) is adapted to be clamped between said wheel (1) and said central flange portion (17) of said axle by a central safety threaded fastener in order to achieve frictionally engaged fastening of said wheel (1) to said axle and the taper ring (23) is formed as a double taper ring, wherein the central bore of said wheel (1) and the outer shape of said central flange portion (17) comprise a tapered section corresponding to said double taper ring (23).

2. The system as claimed in claim 1, characterized in that an adapter flange (12) is provided between said axle and said wheel (1).

3. The system as claimed in claim 1, characterized in that said safety bolt (5) includes a neck (24) and said taper ring is adapted to be pressed between said wheel (1) and said central flange portion (17) by said neck (24).

4. The system as claimed in claim 3, characterized in that a thrust plate (4) is provided between said neck (24) of said safety fastener (5) and said taper ring (23).

5. The system as claimed in claim 1, characterized in that said taper ring (23) is radially slit.

6. The system as claimed in claim 2, characterized in that said safety fastener is a bolt and said adapter flange (12) includes a central bore having an internal thread (19) for receiving said safety bolt (5) in order to fasten said wheel (1) and said adapter flange (12).

7. The system as claimed in claim 6, characterized in that said safety bolt (5) includes a recess distant from its head defined by a radial gap (20) extending over a portion of the circumference of said bolt, wherein a discontinuity of the pitch thread (18) is effectable by mechanically compressing said gap as a self-locking mechanism.

8. The system as claimed in claim 1 characterized in that said flange (17) includes an external thread (27) and said safety fastener is a self-locking nut (26) which is screwable onto said external thread (27) for clamping said taper ring.

* * * * *